(12) United States Patent
Kissa et al.

(10) Patent No.: US 12,118,310 B2
(45) Date of Patent: Oct. 15, 2024

(54) EXTRACTING EXPLAINABLE CORPORA EMBEDDINGS

(71) Applicant: Intuit Inc., Mountain View, CA (US)

(72) Inventors: Maria Kissa, Mountain View, CA (US); Glenn Carter Scott, Los Altos Hills, CA (US)

(73) Assignee: Intuit Inc., Mountain View, CA (US)

( * ) Notice: Subject to any disclaimer, the term of this patent is extended or adjusted under 35 U.S.C. 154(b) by 398 days.

(21) Appl. No.: 17/554,931

(22) Filed: Dec. 17, 2021

(65) Prior Publication Data

US 2023/0196019 A1 Jun. 22, 2023

(51) Int. Cl.
*G06F 40/284* (2020.01)

(52) U.S. Cl.
CPC .................. *G06F 40/284* (2020.01)

(58) Field of Classification Search
CPC .. G06F 40/284; G06F 16/9536; G06F 16/335; G06F 16/367; G06F 16/36; G06F 16/9535
See application file for complete search history.

(56) References Cited

U.S. PATENT DOCUMENTS

| | | | | |
|---|---|---|---|---|
| 2015/0127591 A1* | 5/2015 | Gupta | ..................... | G06Q 50/01 706/12 |
| 2018/0004718 A1* | 1/2018 | Pappu | ................... | H04L 51/216 |
| 2020/0286146 A1* | 9/2020 | Song | ................... | G06F 16/9024 |
| 2021/0081454 A1* | 3/2021 | Sar Shalom | ........ | G06F 16/3331 |

* cited by examiner

*Primary Examiner* — Huyen X Vo
(74) *Attorney, Agent, or Firm* — Lathrop GPM LLP

(57) ABSTRACT

A method extracts explainable corpora embeddings. The method includes constructing a graph with nodes representing terms from a text sequence and edges that include pointwise values generated between pairs of terms. The method further includes generating a rank vector from the graph. Elements of the rank vector correspond to the edges of the graph. A rank value, of the rank values, corresponds to a term from the text sequence. The method further includes selecting the term by comparing the rank vector to a previous rank vector generated for a previous text sequence.

20 Claims, 5 Drawing Sheets

EXTRACTING EXPLAINABLE CORPORA EMBEDDINGS

BACKGROUND

Computing systems generate embeddings from text corpora. The embeddings may be learned in an automated process and be unexplainable to the users of the system. A challenge for computing systems is to generate explainable embeddings from which to rank terms and identify trends using large text corpora.

SUMMARY

In general, in one or more aspects, the disclosure relates to a method that extracts explainable corpora embeddings. The method includes constructing a graph with nodes representing terms from a text sequence and edges that include pointwise values generated between pairs of terms. The method further includes generating a rank vector from the graph. Elements of the rank vector correspond to the edges of the graph. A rank value, of the rank values, corresponds to a term from the text sequence. The method further includes selecting the term by comparing the rank vector to a previous rank vector generated for a previous text sequence.

In general, in one or more aspects, the disclosure relates to a system with a graph controller configured to generate a graph, a rank controller configured to generate a rank vector, selection controller configured to select a term, and a server application executing on one or more servers. The server application is configured for constructing a graph with nodes representing terms from a text sequence and edges that include pointwise values generated between pairs of terms. The server application is further configured for generating a rank vector from the graph. Elements of the rank vector correspond to the edges of the graph. A rank value, of the rank values, corresponds to a term from the text sequence. The server application is further configured for selecting the term by comparing the rank vector to a previous rank vector generated for a previous text sequence.

In general, in one or more aspects, the disclosure relates to a method using explainable corpora embeddings. The method includes interacting, by a client application, with a server application to generate a corpus of text sequences recorded by a server. A graph is constructed with nodes representing terms from a text sequence and edges that include pointwise values generated between pairs of terms. A rank vector is generated from the graph. Elements of the rank vector correspond to the edges of the graph. A rank value corresponds to a term from the text sequence. The term is selected by comparing the rank vector to a previous rank vector generated for a previous text sequence. A recommended text sequence is selected using the term. The method further includes displaying a link to the recommended text sequence.

Other aspects of the invention will be apparent from the following description and the appended claims.

DETAILED DESCRIPTION

Figure 1A:
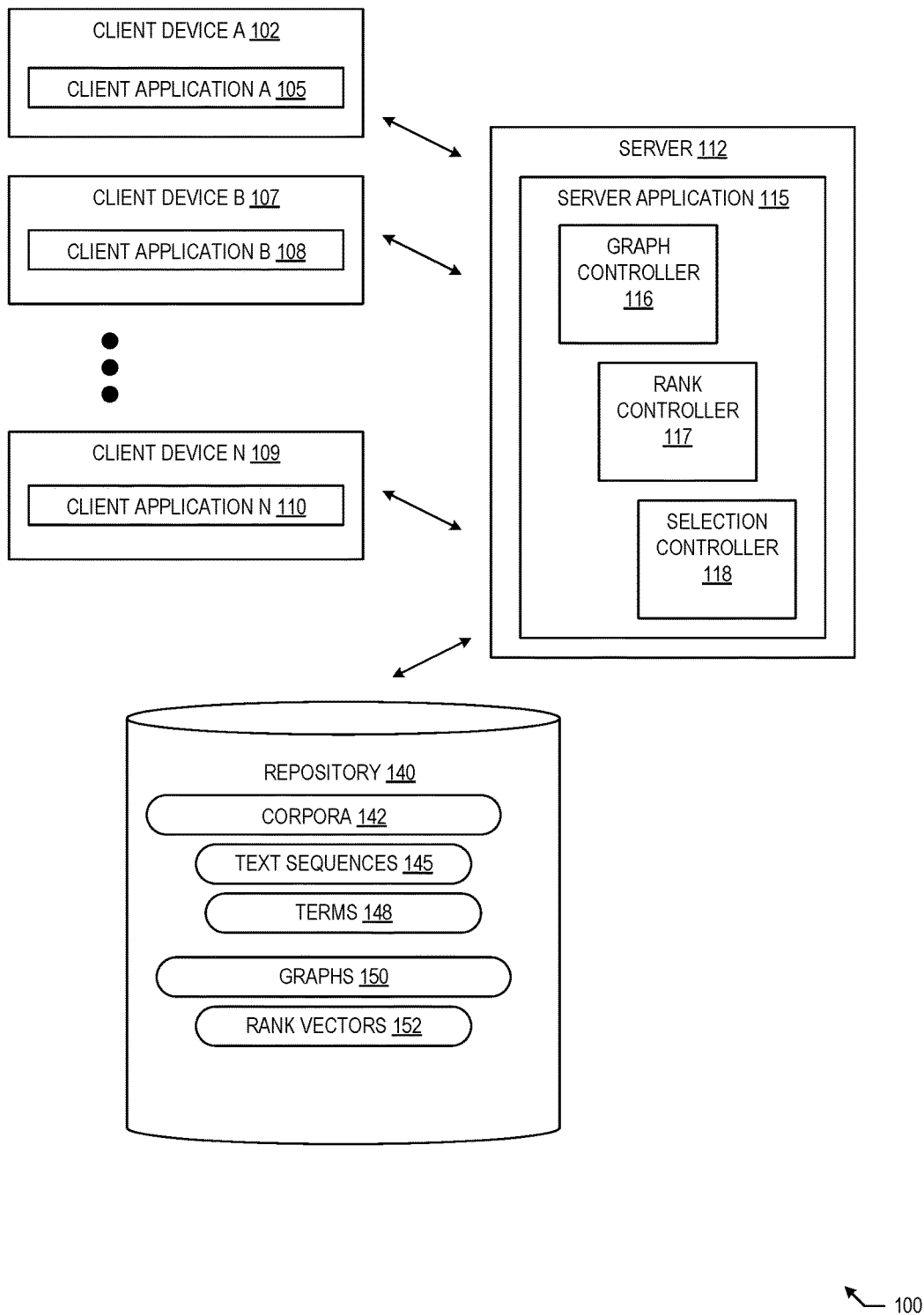
FIG. 1A and FIG. 1B show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure extract explainable corpora embeddings by graphing the terms from the text and ranking the terms. A graph for a corpus (referred to as a text sequence) includes nodes that represents the terms in the text sequence and edges that identify the probability that two terms occur within a predetermined distance of each other within the text sequence. The rank of a term is then determined using the ranks of the other terms that share an edge with the original term. The text sequence is then represented by a rank vector that includes the ranks for each of the terms from the text sequence. After generating rank vectors, the rank vectors may be analyzed to identify trends, which are used to make suggestions to the users of the system.

The rank vector for a text sequence is the set of explainable corpora embeddings for the text sequence. Instead of including unknown embedding dimensions in the rank vector, the dimensions of the rank vector directly correspond to the terms in the text sequence used to generate the rank vector. Additionally, multiple rank vectors may be meaningfully compared with the dimensions (i.e., terms) that are the same between the different rank vectors.

In one embodiment, text sequences (corpora) are generated from web browsing sessions of users. A text sequence may include the text of the documents a user has viewed during the session and include text that describes the actions taken by the user during the session. A single session may be used to generate one or multiple text sequences. In one embodiment, a user may visit a web site three days in a row, with each session translated to a text sequence and corresponding rank vector. In one embodiment, a single session may be divided into multiple time windows (referred to as corpus windows) with the pages and actions during each corpus window being used to generate a text sequence and corresponding rank vector.

Different rank vectors (corresponding to different corpus windows) may be analyzed to identify trends between the different corpus windows (or sessions). For example, a delta vector may be generated by comparing the two rank vectors of adjacent corpus windows. The delta vector may directly identify terms that the user is interested in and links to pages including those terms may be provided to a user during a session.

Figure 1B:
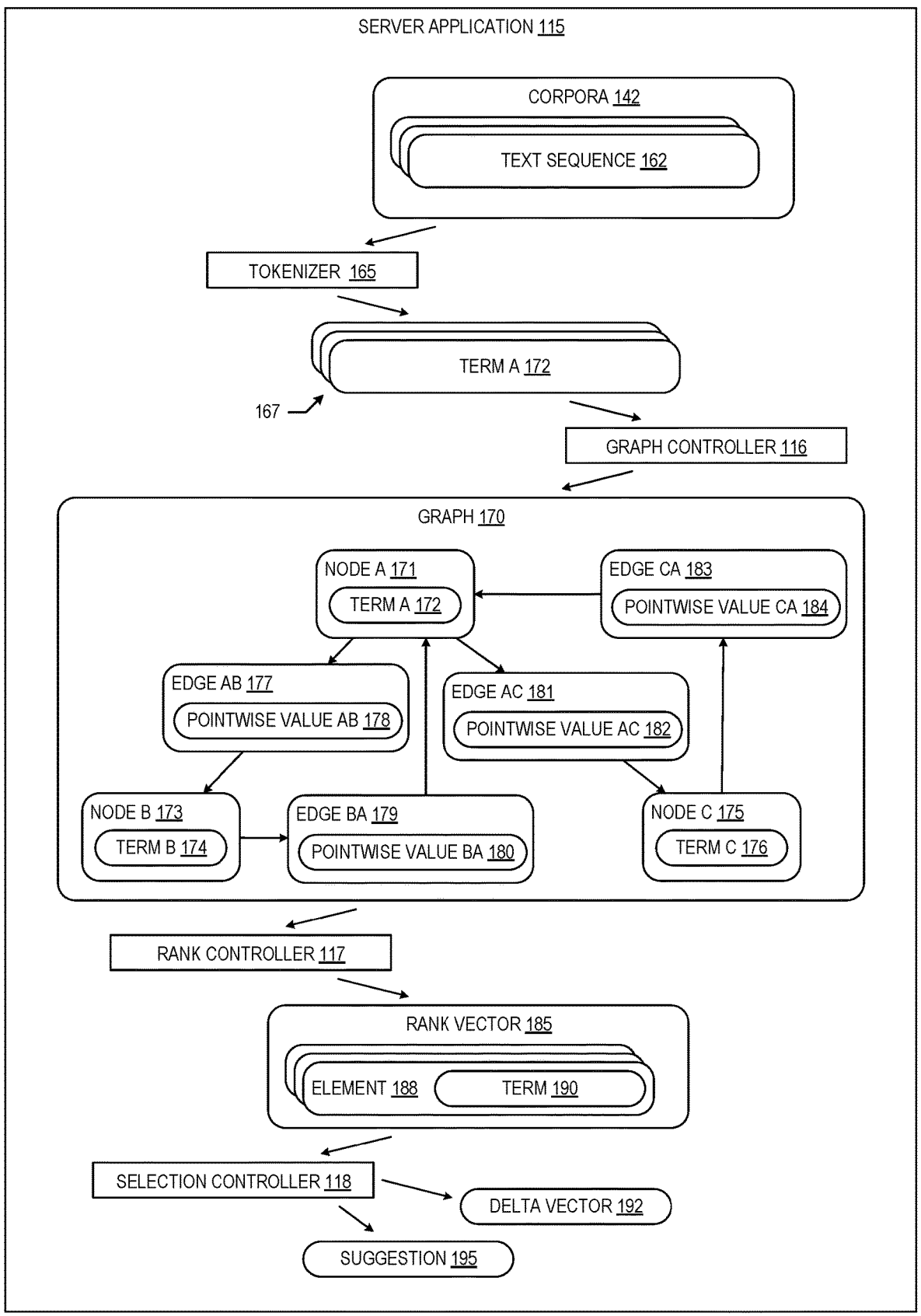

FIGS. 1A and 1B show diagrams of embodiments that are in accordance with the disclosure. FIG. 1A shows a diagram of the system (100) that extracts and uses explainable corpora embeddings. FIG. 1B shows a diagram of the server application (115) that generates graphs and rank vectors used by the system (100). Embodiments of FIGS. 1A and 1B may be combined and may include or be included within the features and embodiments described in the other figures of the application. The features and elements of FIGS. 1A and 1B are, individually and as a combination, improvements to iterative learning technology and computing systems. The various elements, systems, and components shown in FIGS. 1A and 1B may be omitted, repeated, combined, and/or altered as shown from FIGS. 1A and 1B. Accordingly, the scope of the present disclosure should not be considered limited to the specific arrangements shown in FIGS. 1A and 1B.

Turning to FIG. 1A, the system (100) extracts explainable corpora embeddings to provide suggestions to users. In one embodiment, users interact with the server (112) to access web pages and services hosted by the server (112). The system (100) provides suggestions by converting the text sequences (145) to the rank vectors (152) and analyzing the rank vectors (152). The system (100) includes the client devices A (102) through N (109), the server (112), and the repository (140).

Figure 4A:
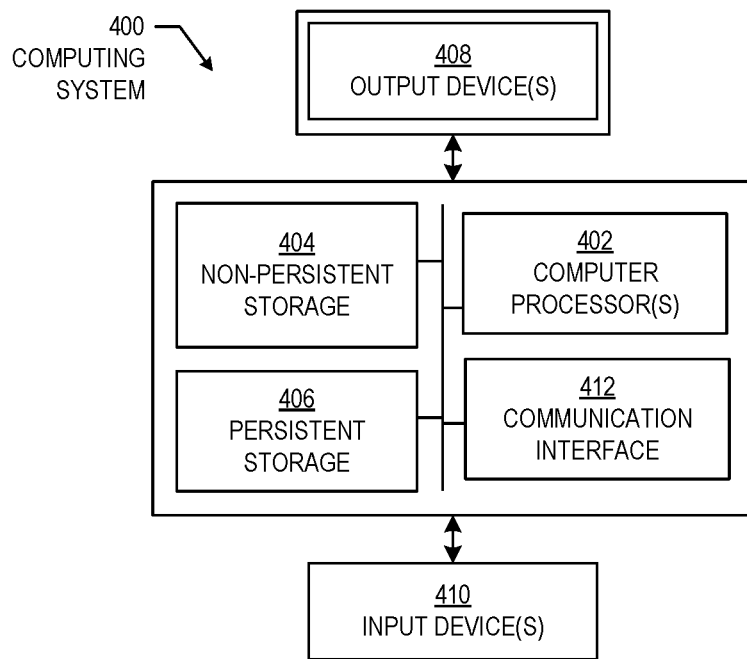
FIG. 4A and FIG. 4B show computing systems in accordance with disclosed embodiments.

The client devices A (102) and B (107) through N (109) are computing systems (further described in FIG. 4A). For example, the client devices A (102) and B (107) through N (109) may be desktop computers, mobile devices, laptop computers, tablet computers, etc. The client devices A (102) and B (107) through N (109) include hardware components and software components that operate as part of the system (100). The client devices A (102) and B (107) through N (109) communicate with the server (112) to access and display documents hosted by the system (100). The client devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The client devices A (102) and B (107) through N (109) respectively include the client applications A (105) and B (108) through N (110).

The client applications A (105) and B (108) through N (110) may each include multiple programs respectively running on the client devices A (102) and B (107) through N (109). The client applications A (105) and B (108) through N (110) may be native applications, web applications, embedded applications, etc. In one embodiment the client applications A (105) and B (108) through N (110) include web browser programs that display web pages from the server (112).

In one embodiment, the client device A (102) may be used to search for information on how to use the services provided by the server (112). For example, the server (112) may host tax preparation services and the user may search for web pages describing the tax preparation services. The user of the client device A (102) may load a website hosted by the server (112).

The server (112) is a computing system (further described in FIG. 4A). The server (112) may include multiple physical and virtual computing systems that form part of a cloud computing environment. In one embodiment, execution of the programs and applications of the server (112) is distributed to multiple physical and virtual computing systems in the cloud computing environment. The server (112) includes the server application (115).

The server application (115) is a collection of programs that may execute on multiple servers of a cloud environment, including the server (112). In one embodiment, the server application (115) hosts websites and provides services for the preparation and filing of tax forms. The server (112) may provide suggestions for web pages to view based on rank vectors generated from the text sequences (145). The server application (115) includes the graph controller (116), the rank controller (117), and the selection controller (118).

The graph controller (116) is a set of hardware and software components of the server application (115). The graph controller (116) generates the graphs (150) from the terms (148) of the text sequences (145) from the corpora (142), which is described further in FIG. 1B.

The rank controller (117) is a set of hardware and software components of the server application (115). The rank controller (117) generates the rank vectors (152) from the graphs (150), which described further in FIG. 1B.

The selection controller (118) is a set of hardware and software components of the server application (115). The selection controller (118) selects terms and generates suggestions for browsing the pages hosted by the server (112), which described further in FIG. 1B.

The repository (140) is a computing system that may include multiple computing devices in accordance with the computing system (400) and the nodes (422) and (424) described below in FIGS. 4A and 4B. The repository (140) may be hosted by a cloud services provider that also hosts the server (112). The cloud services provider may provide hosting, virtualization, and data storage services as well as other cloud services and to operate and control the data, programs, and applications that store and retrieve data from the repository (140). The data in the repository (140) includes the corpora (142), the text sequences (145), the terms (148), the graphs (150), and the rank vectors (152).

The corpora (142) includes the text information that is analyzed by the system (100). The corpora (142) includes web pages hosted by the system. The corpora (142) also includes textual descriptions of the actions taken by the users of the system. For example, the textual description may include a description stating, "USER opened WEB PAGE TITLE at TIMESTAMP", which provides a textual description of a web page opened by a user. Actions for other events may also be described including events that describe mouse inputs, keyboard inputs, etc. Each corpus of the corpora (142) may be extracted from a user session. A user session is a session in which a client device (e.g., the client device A (102)) is connected to the server (112) and accessing information from the server (112).

The text sequences (145) are sequences of text extracted from the corpora (142). A text sequence, of the text sequences (145), may include the text within the web pages a user accesses and the text descriptions of the actions taken by the user during a session.

A text sequence, of the text sequences (145), may correspond to one of the corpora (142). A corpus, of the corpora (142), may correspond to multiple ones of the text sequences (145). A corpus window may define an amount of a corpus that corresponds to one of the text sequences (145). The amount may be defined with respect to a length of time of the user session that corresponds to the corpus. A maximum duration may define a maximum length of time to which a corpus corresponds. As an example, with a corpus corresponding to a user session of 95 minutes and with a maximum duration of 20 minutes, five (5) text sequences may be generated with 4 corresponding to 20 minutes of the user session and a fifth corresponding to 15 minutes of the user session.

In one embodiment, each corpus of the corpora (142) may correspond to one day's worth of activity from one user. Each corresponding text sequence may similarly correspond to the day's worth of activity for the user.

The terms (148) are identified from the text sequences (145). Each one of the text sequences (145) may have multiple terms and the terms may overlap between different text sequences. A term is a group of one or more words that identify a single concept. For example, "First AAA Bank" is three words that are identified as a single term in a text sequence.

The graphs (150) are generated from the terms (148). As described further in FIG. 1B, each graph includes nodes and edges. Each node of a graph represents one of the terms (148). Each edge of a graph represents how often the terms of the nodes of the edge appear together in a text sequence. Each edge corresponds to a pair of terms in the text sequence. The edges may be directed so that, as an example, the pairs of terms "John thought" and "thought John" are represented by two different edges of a graph.

In one embodiment, the value of an edge is calculated from the text sequence.

The pointwise value may be calculated using Equation 1 shown below. The symbols "a" and "b" represent terms from a text sequence; "P(a)" is the probability that the term "a" is found within the text sequence; "P(a,b)" is the probability that the term "a" is found within a maximum distance (referred to as the term distance) of the term "b" within the text sequence; and "PMI(a,b)" is the pointwise mutual information value for the pair of terms "a" and "b", which is a value in the range from "−1" to "1".

$$PMI(a, b) = \log \frac{P(a, b)}{P(a) * P(b)} \quad \text{(Eq. 1)}$$

The pointwise mutual information value may be normalized using Equation 2 shown below. "normPMI(a,b)" is the normalized pointwise mutual information value for the pair of terms "a" and "b". In one embodiment, the edges of the graphs (150) use the normalized pointwise mutual information values calculated using Equation 2.

$$normPMI(a, b) = \frac{PMI(a, b)}{-\log(P(a, b))} \quad \text{(Eq. 2)}$$

For the equations above, a term distance may be used. The term distance identifies the maximum distance that the terms "a" and "b" may be apart and for which a pointwise value may be calculated. For example, with a term distance of 2, and the phrase "the dog is brown", a pointwise value would not be calculated for the pair of terms "the, brown" because "the" is too far away from "brown" in the phrase.

The rank vectors (152) are generated from the graphs (150). One rank vector, of the rank vectors (152), corresponds to one text sequence, of the text sequences (145). The elements of a rank vector correspond to the terms found within a text sequence. The values of the elements may be calculated using Equation 3 below, which embodies a ranking algorithm. "R(a)" is the value of the rank (i.e., rank value) of the term "a"; "d" is a damping factor set to a value between "0" and "1"; "R($t_i$)" is the rank value of the term "$t_i$"; "$t_i$" is a term in a text sequence that is within the term distance of the term "a"; and "C($t_i$)" is the number of terms to which the term "$t_i$" is within the term distance.

$$R(a) = (1 - d) + d \left( \sum_{i=1}^{n} \frac{R(t_i)}{C(t_i)} \right) \quad \text{(Eq. 3)}$$

The ranking algorithm may iterate multiple times. In one embodiment, the first iteration of the rank algorithm uses the inverse of the number of terms in the text sequence (from which the terms are extracted) as the initial rank value for each term.

Turning to FIG. 1B, the server application (115) generates the rank vector (185) from the text sequence (162) and uses the rank vector (185) with the selection controller to select terms used for suggestions for users. The server application (115) includes the tokenizer (165), the graph controller (116), the rank controller (117), and the selection controller (118).

The tokenizer (165) extracts terms (167) (including the term A (172)) from the text sequence (162) of the corpora (142). The tokenizer (165) may identify intended parts of speech of the words in the text sequence (162) to combine multiple words into a single term. The tokenizer (165) lemmatizes the words from the text sequence (162) so that similar words are identified by the same term in the terms (167).

The graph controller (116) generates the graph (170) from the terms (167) (including the term A (172)) extracted from the text sequence (162). The graph controller (116) generates an edge for each pair of terms that are within the maximum term distance in the text sequence (162). In one embodiment, the graph controller (116) filters out edges with values (e.g., normalized pointwise mutual information values) calculated to be less than or equal to 0. The graph (170) includes the nodes A (171), B (173), and C (175) and the edges AB (177), BA (179), AC (181), and CA (183).

The nodes A (171), B (173), and C (175) respectively correspond to the terms A (172), B (174), and C (176), which are from the text sequence (162). The nodes A (171), B (173), and C (175) have a one-to-one correspondence with the terms (167).

The edges AB (177), BA (179), AC (181), and CA (183) respectively include the pointwise values AB (178), BA (180), AC (182), and CA (184). In one embodiment, the pointwise values AB (178), BA (180), AC (182), and CA (184) are calculated by the graph controller (116) as normalized pointwise mutual information values using Equation 2 above. The graph (170) does not include edges between the node B (173) and the node C (175) because the corresponding terms B (174) and C (176) do not appear within the text sequence (162) within the maximum term distance.

The rank controller (117) generates the rank vector (185) from the graph (170), which was generated from the terms (167), which were extracted from the text sequence (162). In one embodiment, the rank controller (117) uses the rank algorithm described above to generate the rank vector (185). The rank vector (185) includes multiple elements (including the element (188)). The element (188) corresponds to the term A (172) and includes the rank value for the term A (172) calculated with the rank algorithm.

The selection controller (118) receives the rank vector (185) and generates the delta vector (192) and the suggestion (195). The delta vector (192) is a vector generated by comparing (e.g., subtracting) the rank vector (185) with a previously generated rank vector. The previously generated rank vector may correspond to a previous text sequence from the corpora (142) for a user. The selection controller (118) identifies a term within the delta vector (192) based on a criterion (e.g., the term with the highest value) and identifies the suggestion (195) using the identified term. The identified term may be referred to as a trending term.

The suggestion (195) may be a web page (the text of which forms a text sequence) in which a rank vector for the web page matches to the term identified from the delta vector (192). The web page may match to the term based on a criterion. As an example, the web page may correspond to a rank vector having an element corresponding to the identified term and having a highest value from a pool of rank vectors corresponding to a pool of web pages.

In one embodiment, the suggestion (195) may be matched to the delta vector (192) directly. For example, the delta vector (192) may be compared to a pool of rank vectors (corresponding to a pool of web pages) to identify the rank vector with the closest similarity to the delta vector (192). In one embodiment, the similarity is identified by taking a dot product between the delta vector (192) and the individual rank vectors and ranking the results.

Figure 2:
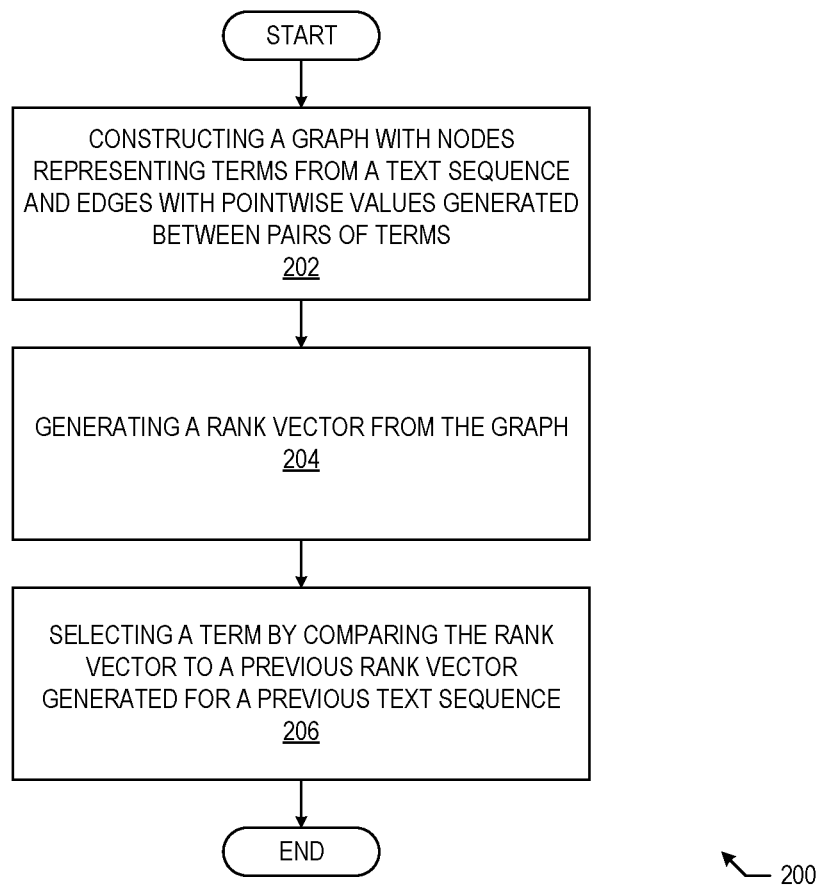
FIG. 2 shows a flowchart in accordance with disclosed embodiments.

FIG. 2 shows a flowchart of a process in accordance with the disclosure. FIG. 2 illustrates the process (200) to extract explainable corpora embeddings. The embodiments of FIG. 2 may be combined and may include or be included within the features and embodiments described in the other figures of the application. The features of FIG. 2 are, individually and as an ordered combination, improvements to iterative learning technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively.

Turning to FIG. 2, the process (200) optimizes questions to retain engagement. The process (200) may execute as part of a server application.

At Step 202, a graph is constructed with nodes and edges. The nodes represent and correspond to the terms from a text sequence and the edges include pointwise values that are generated between pairs of terms from a text sequence.

The text sequence may include text from documents and user action descriptions. The documents may be web pages hosted by a server. The user action descriptions are textual descriptions of the actions and events taken and triggered by the user of the system. The documents and user action descriptions may be extracted from a corpus using a corpus window. A corpus window defines a start time and an end time of a user session. In one embodiment, the text of the documents viewed during the corpus window and the text of the user action descriptions for the actions taken during the corpus window form the text sequence. The text sequence may be formed by concatenating the text from the documents and user action descriptions.

The session may be initiated between a client device and a server in response to a request from the server to access a document or service hosted by the server. The session may last until the user closes a connection between the user device and the server.

In one embodiment, words from the text sequence are tokenized to identify the terms of the text sequence. The text sequence may be tokenized by splitting the words of the text sequence into an ordered list of words. The parts of speech for each word may be identified. Multiple words that form a proper name may be combined into a single word or token. Different forms of the same words may be stemmed and lemmatized to be represented by the same token. In one embodiment, a token is a unique integer value that represents a word from the list of words.

In one embodiment, constructing the graph includes selecting pairs of terms, generating the point wise values for the edges, and filtering out edges. A pair includes two terms that are within the term distance of each other within the text sequence. The pair "a, b" is different from the pair "b, a". Each pair from the list of pairs forms an edge of the graph. The system may generate a list that includes each of the pairs of terms that are within the term distance of each other and then process each pair from the list.

A pointwise value (e.g., a normalized pointwise mutual information value) is generated for each pair, i.e., each edge. Edges corresponding to pairs with pointwise values that do not meet a threshold are filtered out of the edges for the graph. For example, edges with pointwise values less or equal to 0 may be removed so that only edges with values above 0 remain in the graph.

At Step 204, rank vectors are generated from graphs. A rank vector may be generated for each graph constructed by the system. The elements of a rank vector correspond to the edges of the graph from which the rank vector is generated. Each element of a rank vector includes a rank value and corresponds to a term from the text sequence used to generate the graph. The rank value of a specific term for an element of a rank vector is generated using the ranks of the terms within the term distance to the specific term and using the number of terms within the term distance to the term. For example, the ranking algorithm of Equation 3 above may be used.

At Step 206, terms are selected by comparing rank vectors. A rank vector may be compared to a previous rank vector that was generated for a previous text sequence. In one embodiment, a rank vector is compared to a previous rank vector by generating a delta vector from the rank vector and the previous rank vector. In one embodiment, the values of the elements of the delta vector may be generated by subtracting the values of the elements of the previous rank vector from the values of the elements of the rank vector.

After generating the delta vector, a criterion may be used to select a term. For example, the criterion may be to identify the term corresponding to the element with the largest value in the delta vector.

After selecting the term, a recommended text sequence may be selected using the term. The recommended text sequence may be a document that corresponds to the term. For example, a pool of rank vectors may be generated for a pool of web pages (i.e., a pool of documents) the web page with the highest value for the element corresponding to the selected term may be identified as the recommended text sequence.

Figure 3:
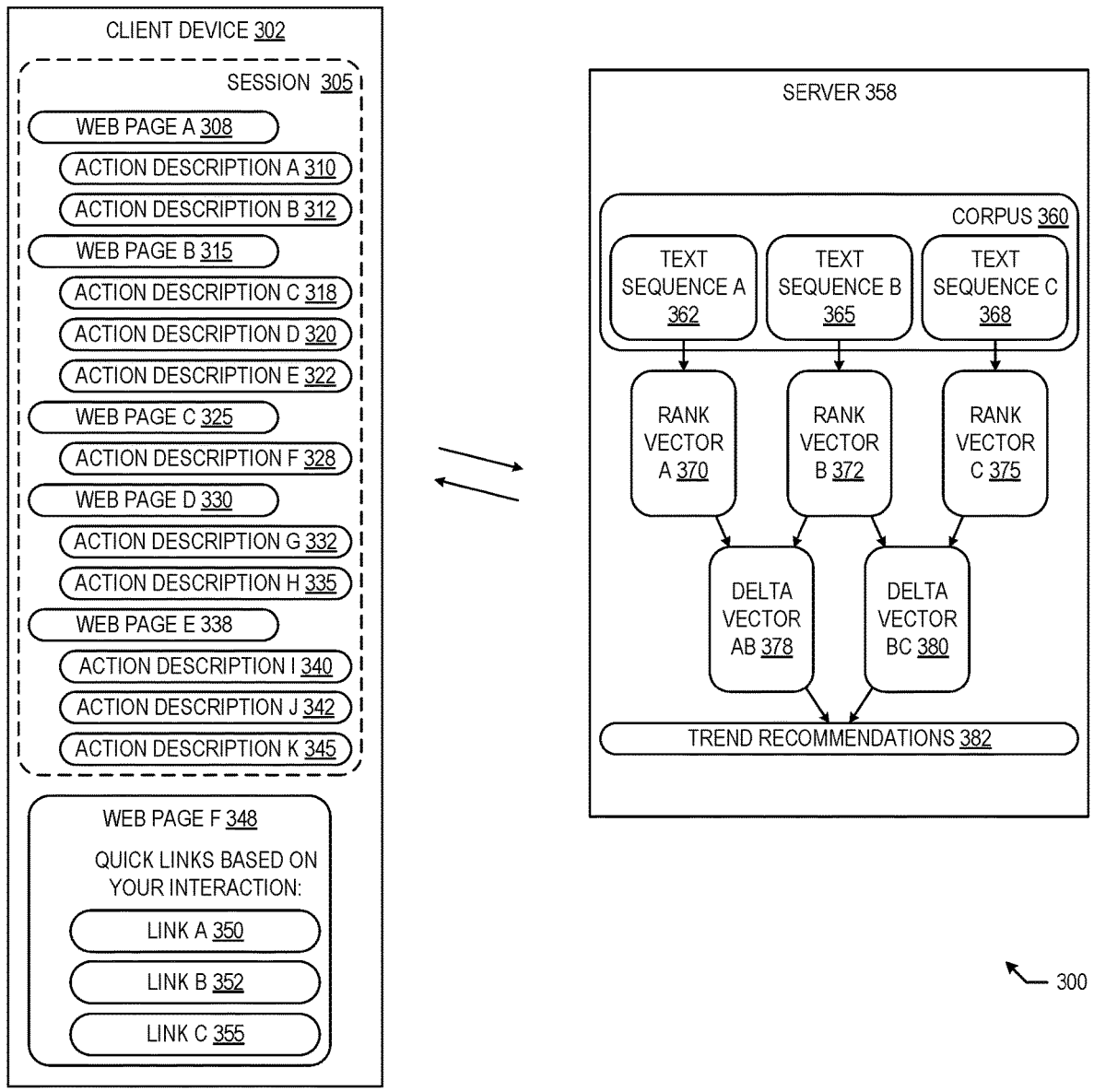
FIG. 3 shows examples in accordance with disclosed embodiments.

FIG. 3 shows examples in accordance with the disclosure. FIG. 3 shows a system that generates explainable corpora embeddings, which are used to provide suggestions. The embodiments shown in FIG. 3 may be combined and may include or be included within the features and embodiments described in the other figures of the application. The features and elements of FIG. 3 are, individually and as a combination, improvements to iterative learning technology and computing systems. The various features, elements, widgets, components, and interfaces shown in FIG. 3 may be omitted, repeated, combined, and/or altered as shown. Accordingly, the scope of the present disclosure should not be considered limited to the specific arrangements shown in FIG. 3.

Turning to FIG. 3, the system (300) extracts and uses explainable corpora embeddings. The system (300) includes the client device (302) and the server (358).

The client device (302) is a computing system used to access the web pages A (308), B (315), C (325), D (330), E (338), and F (348) from the server (358) during the session (305). The session (305) is an interactive session between the client device (302) and the server (358) in which the client device (302) accesses the pages A (308) through F (348) and performs actions described by the action descriptions A (310), B (312), C (318), D (320), E (322), F (328), G (332), H (335), I (340), J (342), and K (345).

The action descriptions A (310) through K (345) describe the actions taken by the user of the client device (302) during the session (305) to access and view the web pages A (308) through F (348). The action descriptions A (310) through K (345) may include access requests, page events, mouse events, keyboard events, etc. For example, the action description A (310) corresponds to the user scrolling the web page A (308) and the action description B (312) corresponds to the user clicking a link on the web page A (308) to access the web page B (315). The action descriptions A (310) through K (345) may be transmitted by the client device (302) to the server (358) during the session (305). The action description K (345) accesses the web page F (348).

The web page F (348) is a document hosted by the server (358). The web page F (348) includes the links A (350), B (352), and C (355).

The links A (350) through C (355) are links to other web pages, which may be hosted by the server (358). The links A (350) through C (355) correspond to the trend recommendations (382) generated by the server (358) in response to the session (305).

The server (358) is a computing system that hosts web pages and services that are accessed and used by the client device (302). The server (358) generates the trend recommendations (382) from the corpus (360).

The corpus (360) is a collection of text information that corresponds to the sessions (including the session (305)) between the client device (302) and the server (358). The corpus (360) includes the text sequences A (362), B (365), and C (368).

The text sequences A (362) through C (368) include the text of documents and user action descriptions for the sessions encompassed by the corpus (360). The text sequence C (368) corresponds to a corpus window for the session (305) and the text sequences B (365) and A (362) correspond to previous sessions and corpus windows thereof. For example, the text sequence C (368) includes text of the web pages A (308) through F (348) and of the action descriptions A (310) through K (345).

The text of the web pages A (308) through F (348) may include the full text of each web page or a filtered version of the text. For example, the text may be filtered to include the title and body text without the text for the tags and properties of the web pages.

The text of the action descriptions A (310) through K (345) may be generated by the server (358). For example, in response to a user action, the client device may transmit an event notification for the user action to the server (358). The server (358) may convert the event notification into a textual sentence. For example, the action description may be converted from a JavaScript Object Notation (JSON) string:

```
{
    "UserID" : "USER_NAME",
    "Action" : "mouse hover over link"
    "Link" : "<a href="http://www.ABC.com/">ABC is the place to be.</a>"
}
``` to the text string:
"USER_NAME hovered the mouse over the link to ABC.com"

The rank vectors A (370), B (372), and C (375) are respectively generated from the text sequences A (362), B (365), and C (368). The elements of the rank vectors A (370) through C (375) include rank values that correspond to the terms from the text sequences A (362) through C (368) and form explainable corpora embeddings. Terms with higher rank values in a rank vector correspond to terms that are used more often in the corresponding text sequence. The rank vectors A (370) through C (375) are used to form the delta vectors AB (378) and BC (380).

The delta vectors AB (378) and BC (380) are generated by the server (358) from the rank vectors A (370) through C (375). The delta vector BC (380) is generated by comparing the rank vector B (372) (which corresponds to the second most recent text sequence B (365)) and the rank vector C (375) (which corresponds to the most recent text sequence C (368)). The delta vector BC (380) may be generated by subtracting the rank vector B (372) from the rank vector C (375). The delta vectors AB (378) and BC (380) are used to generate the trend recommendations (382).

The trend recommendations (382) are generated from the delta vectors AB (378) and BC (380). In one embodiment, the trend recommendations (382) are generated by identifying a threshold number of terms from the delta vectors AB (378) and BC (380) and web pages that correspond to the identified terms. The threshold number of terms may be identified by averaging the delta vectors AB (378) and BC (380) and then selecting the threshold number of elements having the highest average rank values. The terms corresponding to the selected elements are identified as the trending terms that may correspond to the interests of the user of the client device (302).

The server (358) searches a pool of web pages to find the pages that correlate with the trending terms. For example, if a trending terms include "print" and "worksheet", the server (358) may identify the web pages having rank vectors with the highest rank values for the terms "print" and "worksheet". Links to the top three pages that correlate with the trending terms are transmitted as the links A (350), B (352), and C (355), which are displayed by the client device (302).

Embodiments of the invention may be implemented on a computing system. Any combination of a mobile, a desktop, a server, a router, a switch, an embedded device, or other types of hardware may be used. For example, as shown in FIG. 4A, the computing system (400) may include one or more computer processor(s) (402), non-persistent storage (404) (e.g., volatile memory, such as a random access memory (RAM), cache memory), persistent storage (406) (e.g., a hard disk, an optical drive such as a compact disk (CD) drive or a digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) (402) may be one or more cores or micro-cores of a processor. The computing system (400) may also include one or more input device(s) (410), such as a touchscreen, a keyboard, a mouse, a microphone, a touchpad, an electronic pen, or any other type of input device.

The communication interface (412) may include an integrated circuit for connecting the computing system (400) to a network (not shown) (e.g., a local area network (LAN), a wide area network (WAN) such as the Internet, a mobile network, or any other type of network) and/or to another device, such as another computing device.

Further, the computing system (400) may include one or more output device(s) (408), such as a screen (e.g., a liquid crystal display (LCD), a plasma display, a touchscreen, a cathode ray tube (CRT) monitor, a projector, or other display device), a printer, an external storage, or any other output device. One or more of the output device(s) (408) may be the same or different from the input device(s) (410). The input and output device(s) (410 and (408)) may be locally or remotely connected to the computer processor(s) (402), non-persistent storage (404), and persistent storage (406). Many different types of computing systems exist, and the aforementioned input and output device(s) (410 and (408)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system (400) shown in FIG. 4A, or a group of nodes combined may correspond to the computing system (400) shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Figure 4B:
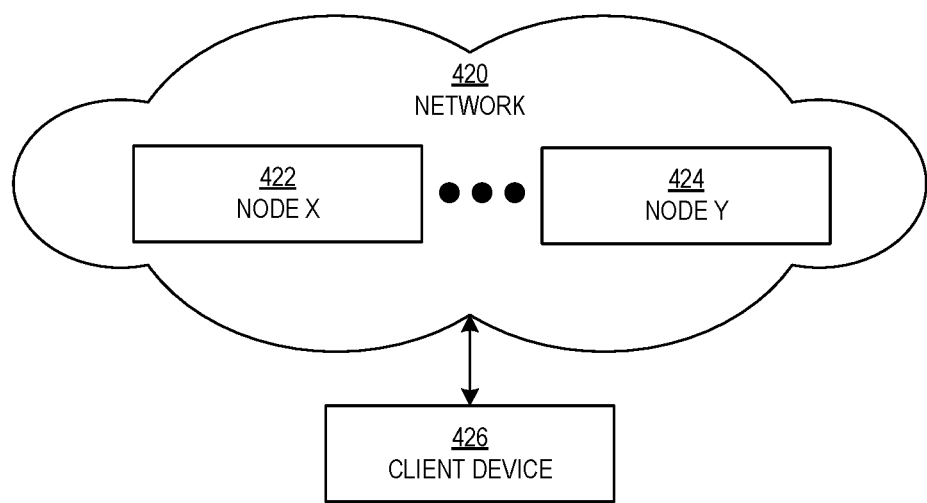

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system (400) shown in FIG. 4A. Further, the client device (426) may include and/or perform all or a portion of one or more embodiments of the invention.

The computing system (400) or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (400) in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections).

Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (400) of FIG. 4A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (400) in FIG. 4A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (400) of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (400) of FIG. 4A and the nodes (e.g., node X (422), node Y (424)) and/or client device (426) in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
constructing a graph with a plurality of nodes representing a plurality of terms from a text sequence and a plurality of edges comprising a plurality of pointwise values generated between pairs of terms from the plurality of terms, wherein the text sequence is extracted from a session;
generating a rank vector from the graph, wherein a plurality of elements of the rank vector correspond to the plurality of edges of the graph, and wherein a rank value, of a plurality of rank values, corresponds to a term, of the plurality of terms, from the text sequence;
selecting the term by comparing the rank vector for the session to a previous rank vector generated from a previous text sequence for a previous session;
selecting a recommended text sequence using the term; and
presenting a link to the recommended text sequence.

2. The method of claim 1, further comprising:
presenting the recommended text sequence.

3. The method of claim 1, further comprising:
selecting the recommended text sequence by:
comparing the term to a plurality of rank vectors for a plurality of text sequences that include the recommended text sequence.

4. The method of claim 1, further comprising:
initiating the session from which the text sequence is selected.

5. The method of claim 1, wherein the text sequence comprises text from one or more of a document and a user action description.

6. The method of claim 1, further comprising:
selecting a corpus window of the session as the text sequence.

7. The method of claim 1, further comprising:
tokenizing words from the text sequence to generate the plurality of terms.

8. The method of claim 1, further comprising:
selecting a pair of terms, of the plurality of terms, using a term distance;
generating a pointwise value, of the plurality of pointwise values, for the pair of terms using a pointwise mutual information algorithm; and
filtering out, from the plurality of edges, one or more edges with pointwise values that do not satisfy a threshold.

9. The method of claim 1, further comprising:
generating the rank value of the term using a plurality of ranks of terms within a term distance to the term and a number of terms within the term distance to the term.

10. The method of claim 1, further comprising:
comparing the rank vector to the previous rank vector by generating a delta vector from the rank vector and the previous rank vector.

11. The method of claim 1, further comprising:
selecting the term by selecting a delta element from a delta vector using a criterion, wherein the delta element corresponds to the term.

12. A system comprising:
at least one processor;
a graph controller executing on the at least one processor to generate a graph;
a rank controller executing on the at least one processor to generate a rank vector;
a selection controller executing on the at least one processor configured to select a term; and
a server application executing on the at least one processor, performing:
constructing the graph with a plurality of nodes representing a plurality of terms from a text sequence and a plurality of edges comprising a plurality of pointwise values generated between pairs of terms from the plurality of terms, wherein the text sequence is extracted from a session, generating the rank vector from the graph, wherein a plurality of elements of the rank vector correspond to the plurality of edges of the graph, and wherein a rank value, of a plurality of rank values, corresponds to the term, of the plurality of terms, from the text sequence, selecting the term by comparing the rank vector for the session to a previous rank vector generated from a previous text sequence for a previous session, selecting a recommended text sequence using the term, and presenting a link to the recommended text sequence.

13. The system of claim 12, wherein the server application is further configured for:
presenting the recommended text sequence.

14. The system of claim 12, wherein the server application is further configured for:
selecting the recommended text sequence by:
comparing the term to a plurality of rank vectors for a plurality of text sequences that include the recommended text sequence.

15. The system of claim 12, wherein the server application is further configured for:
initiating the session from which the text sequence is selected.

16. The system of claim 12, wherein the text sequence comprises text from one or more of a document and a user action description.

17. The system of claim 12, wherein the server application is further configured for:
selecting a corpus window of the session as the text sequence.

18. The system of claim 12, wherein the server application is further configured for:
tokenizing words from the text sequence to generate the plurality of terms.

19. The system of claim 12, wherein the server application is further configured for:
selecting a pair of terms, of the plurality of terms, using a term distance;
generating a pointwise value, of the plurality of pointwise values, for the pair of terms using a pointwise mutual information algorithm; and
filtering out, from the plurality of edges, one or more edges with pointwise values that do not satisfy a threshold.

20. A method comprising:
interacting, by a client application, with a server application to generate a corpus of text sequences recorded by a server,
wherein, a graph is constructed with a plurality of nodes representing a plurality of terms from a text sequence and a plurality of edges comprising a plurality of pointwise values generated between pairs of terms from the plurality of terms,
wherein the text sequence is extracted from a session,
wherein a rank vector is generated from the graph, wherein a plurality of elements of the rank vector correspond to the plurality of edges of the graph, and wherein a rank value, of a plurality of rank values, corresponds to a term, of the plurality of terms, from the text sequence, and
wherein the term is selected by comparing the rank vector for the session to a previous rank vector generated from a previous text sequence for a previous session, and
wherein a recommended text sequence is selected using the term; and
displaying a link to the recommended text sequence.

* * * * *